United States Patent
Doteguchi et al.

(10) Patent No.: US 9,436,488 B2
(45) Date of Patent: Sep. 6, 2016

(54) PROGRAM REDUNDANCY AMONG VIRTUAL MACHINES AND GLOBAL MANAGEMENT INFORMATION AND LOCAL RESOURCE INFORMATION ARRANGEMENT

(75) Inventors: Masahiro Doteguchi, Kawasaki (JP); Kenji Okano, Sunnyvale, CA (US); Takehiro Okabe, Sunnyvale, CA (US); Nikolay Polyakov, Sunnyvale, CA (US); Reiji Watanabe, Sunnyvale, CA (US); Kenji Gotsubo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 653 days.

(21) Appl. No.: 13/431,086

(22) Filed: Mar. 27, 2012

(65) Prior Publication Data

US 2013/0263115 A1 Oct. 3, 2013

(51) Int. Cl.
*G06F 9/455* (2006.01)
*G06F 9/445* (2006.01)
*G06F 11/14* (2006.01)
(Continued)

(52) U.S. Cl.
CPC ......... *G06F 9/45533* (2013.01); *G06F 9/4401* (2013.01); *G06F 9/445* (2013.01); *G06F 11/1484* (2013.01); *G06F 9/45558* (2013.01); *G06F 9/5077* (2013.01); *G06F 11/07* (2013.01)

(58) Field of Classification Search
CPC ............... G06F 11/07; G06F 11/2038; G06F 11/1482; G06F 9/455; G06F 9/45533; G06F 9/4401
USPC ...................................... 718/1; 714/11, 4.11
See application file for complete search history.

(56) References Cited

U.S. PATENT DOCUMENTS 8,032,781 B1 * 10/2011 Coatney et al. ............. 714/4.11
8,296,603 B2 * 10/2012 Matsumoto .................. 714/10
(Continued)

FOREIGN PATENT DOCUMENTS

JP  2006-24214   1/2006
JP  2009-181249  8/2009
(Continued)

OTHER PUBLICATIONS

Extended European Search Report issued Jul. 16, 2013 in corresponding European Application No. 12188127.0.
(Continued)

*Primary Examiner* — Abu Ghaffari
(74) *Attorney, Agent, or Firm* — Staas & Halsey LLP

(57) ABSTRACT

An information processing apparatus that mounts a first and second system boards SB#0 and SB#1 includes a virtualization control unit that operates a virtual machine for virtualizing hardware resources. The SB#0 includes a memory that stores a command line, resource information, and management information. The SB#1 includes a memory that stores a command line and resource information. The command line is executed by the virtualization control unit. The resource information is data used by each system board from among data used when the virtualization control unit operates. The management information is data commonly shared by each system board and used by the virtualization control unit. A command line and resource information are used when the virtualization control unit operates and information on the hardware resources included in the corresponding SB. Each SB executes the command line and refers to the information stored in the memory in SBs.

6 Claims, 13 Drawing Sheets

(51) Int. Cl.
*G06F 9/44* (2006.01)
*G06F 9/50* (2006.01)
*G06F 11/07* (2006.01)

(56) References Cited

U.S. PATENT DOCUMENTS

| | | | |
|---|---|---|---|
| 8,416,253 B2* | 4/2013 | Minematsu et al. | 345/545 |
| 8,555,279 B2* | 10/2013 | Nonaka | G06F 9/5077 718/1 |
| 8,776,050 B2* | 7/2014 | Plouffe et al. | 718/1 |
| 2006/0010450 A1 | 1/2006 | Culter | |
| 2008/0201479 A1* | 8/2008 | Husain et al. | 709/227 |
| 2009/0217163 A1 | 8/2009 | Jaroker | |
| 2009/0276771 A1* | 11/2009 | Nickolov et al. | 717/177 |
| 2009/0327643 A1* | 12/2009 | Goodman et al. | 711/173 |
| 2010/0235833 A1* | 9/2010 | Huang et al. | 718/1 |
| 2011/0185064 A1* | 7/2011 | Head | G06F 9/5077 709/226 |
| 2011/0219372 A1* | 9/2011 | Agrawal | G06F 9/45558 718/1 |
| 2013/0055249 A1* | 2/2013 | Vaghani et al. | 718/1 |

FOREIGN PATENT DOCUMENTS

| | | |
|---|---|---|
| JP | 2010-9567 | 1/2010 |
| JP | 2011-192194 | 9/2011 |

OTHER PUBLICATIONS

Kinshuk Govil et al, "Cellular Disco: resource management using virtual clusters on shared-memory multiprocessors", Operating Systems Review, ACM, New York, vol. 33, No. 5, Dec. 1, 1999, pp. 154-169.

Office Action issued by the Japanese Patent Office on Dec. 8, 2015 in corresponding Japanese patent application No. 2012-180670.

Office Action issued by the Japanese Patent Office on Jul. 12, 2016 in corresponding Japanese patent application No. 2012-180670.

* cited by examiner

FIG.12

| NUMBER OF SBs | LOCAL [MB] | GLOBAL [MB] | TOTAL [MB] |
|---|---|---|---|
| 1 | 74.2 | 1191.5 | 1265.7 |
| 2 | 148.4 | 1191.5 | 1339.9 |
| 4 | 296.8 | 1191.5 | 1488.3 |
| 8 | 593.6 | 1191.5 | 1785.1 |
| 16 | 1187.2 | 1191.5 | 2378.7 |

PROGRAM REDUNDANCY AMONG VIRTUAL MACHINES AND GLOBAL MANAGEMENT INFORMATION AND LOCAL RESOURCE INFORMATION ARRANGEMENT

FIELD

The embodiments discussed herein are directed to an information processing apparatus, an apparatus management method, and an apparatus management program.

BACKGROUND

A virtualization technology is known that operates virtual operating systems (OS) by operating firmware, such as a hypervisor. For example, in a server system in which multiple physical partitions are arranged, a hypervisor is operated in each physical partition and a virtual OS is operated in each physical partition.

Furthermore, this virtualization technology is also used in a server system constituted by multiple system boards. In the server system, a hypervisor is operated and the hypervisor implements a virtualization system by providing one or more operating systems with a virtualization function.

FIG. 14 is a schematic diagram illustrating an example of a conventional virtualization system. The information processing apparatus illustrated in FIG. 14 performs a virtualization system. A total of three system boards (SBs) can be mounted on the information processing apparatus. In this case, two system boards, i.e., an SB#0 and an SB#1, are mounted. Each of the SBs includes two central processing units (CPU) and a single memory. The memory mounted on the SB#0 stores therein a program text in which a hypervisor instruction is described and management data that is used by the hypervisor. In the memory mounted on the SB#0, memory capacity is reserved that is capable of storing therein the amount of management data corresponding to the number of system boards that can be mounted. Specifically, in the memory mounted on the SB#0, a region that can manage information, as the management data, on the SB#0, the SB#1, and an SB#2 is reserved.

Patent Document 1: Japanese Laid-open Patent Publication No. 2010-009567

Patent Document 2: Japanese Laid-open Patent Publication No. 2006-024214

However, with the conventional technology, there is a problem in that time is needed before the system is booted up. For example, because the management data that is used by the hypervisor to control its operation is concentrated in a single area in the server system, time is needed, for example, to perform an initialization process of each system board.

In the case illustrated in FIG. 14, because the SB#0 has a program text and management data, either one of the CPUs included in the SB#0 executes the initialization of the SB#0 or the SB#1. Accordingly, the CPU in the SB#0 sequentially executes the initialization process of each SB and the system is booted up after the completion of all of the initialization processes. Therefore, it takes a long time before the system is booted up.

SUMMARY

According to an aspect of an embodiment of the invention, an information processing apparatus that mounts a first system board and a second system board includes a virtualization control unit that controls a virtual machine for virtualizing hardware resources included in the first system board and the second system board, wherein the first system board includes a first storing unit that stores therein a command line executed by the virtualization control unit, resource information, which is data used by each of the system boards from among data used when the virtualization control unit operates and is information on the hardware resources included in the first system board, and management information, which is data commonly shared by each of the system boards from among data used when the virtualization control unit operates and is information on the virtual machine and on the system boards included in the information processing apparatus, the second system board includes a second storing unit that stores therein a command line and resource information, which is data used by each of the system boards from among data used when the virtualization control unit operates and is information on the hardware resources included in the second system board, the first system board further includes a first execution control unit that executes the command line stored in the first storing units and refers to the information stored in the first storing unit, and the second system board further includes a second execution control unit that executes the command line stored in the second storing units and refers to the information stored in the second storing unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 12 is a schematic diagram illustrating a case in which memory capacity can be reduced;

DESCRIPTION OF EMBODIMENTS

Preferred embodiments of the present invention will be explained with reference to accompanying drawings. The present invention is not limited to the embodiments described below.

[a] First Embodiment

Figure 1:
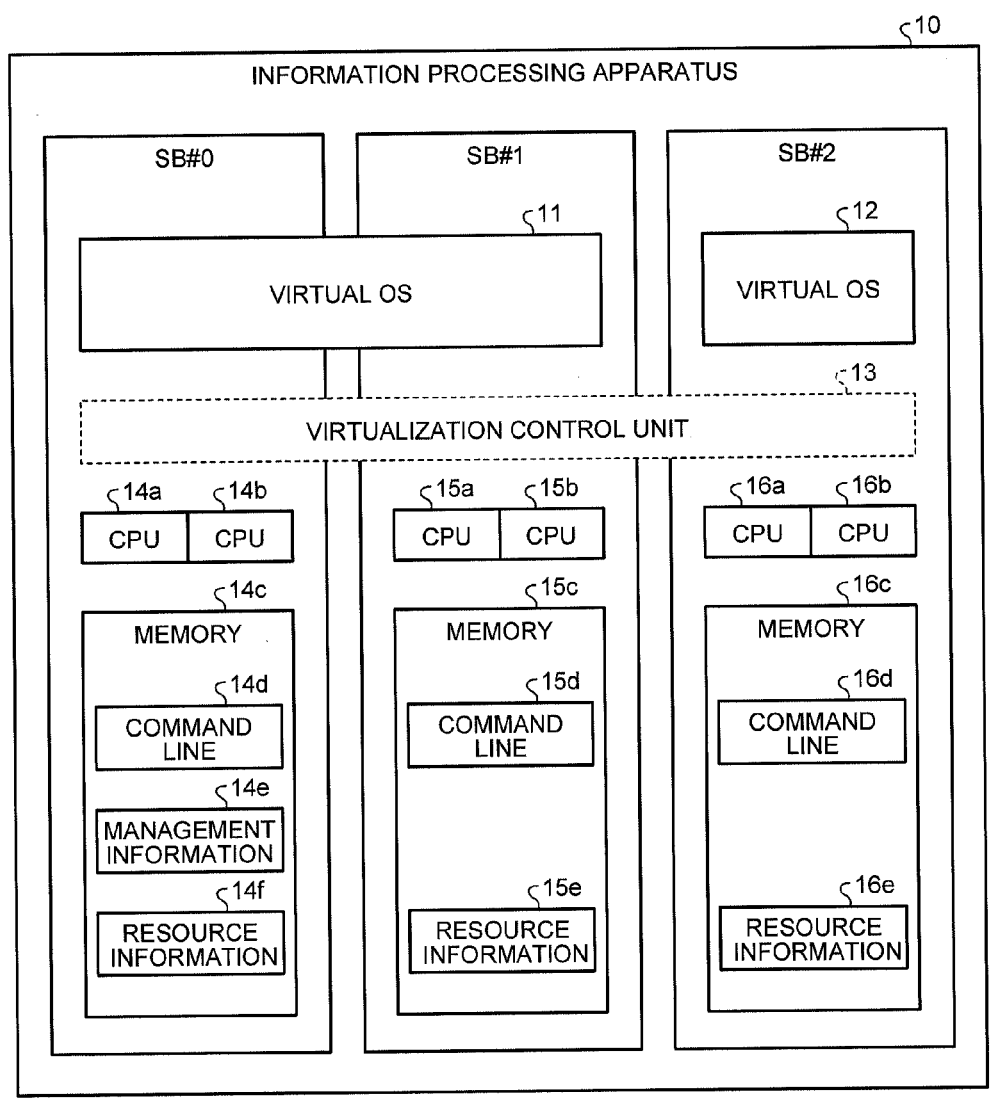
FIG. 1 is a schematic diagram illustrating an example of the overall configuration of an information processing apparatus according to a first embodiment.

FIG. 1 is a schematic diagram illustrating an example of the overall configuration of an information processing apparatus according to a first embodiment. As illustrated in FIG. 1, an information processing apparatus 10 is a system on which multiple system boards (SB) can be mounted.

FIG. 1 illustrates an example case in which three SBs, i.e., the SB#0, the SB#1, and the SB#2, are mounted on the information processing apparatus 10; however, the present invention is not limited thereto. For example, any given number of SBs can be mounted in accordance with the size or the performance of the information processing apparatus.

Furthermore, at least one central processing unit (CPU) and a memory are mounted on each SB. Specifically, a CPU 14a, a CPU 14b, and a memory 14c are mounted on the SB#0. A CPU 15a, a CPU 15b, and a memory 15c are mounted on the SB#1. A CPU 16a, a CPU 16b, and a memory 16c are mounted on the SB#2.

Each memory is a storage device that stores therein a program or data. Each CPU is a processing unit that performs the overall control of the SB, reads commands stored in a memory or the like and executes them. In this case, a case is described as an example in which two CPUs and one memory are mounted on each SB; however the configuration is not limited thereto. For example, a given number of CPUs or memories may also be mounted on each SB. Furthermore, other hardware may also be mounted on each SB.

A virtualization control unit 13 is a processing unit that virtualizes the hardware included in each SB and provides a virtual OS. For example, the virtualization control unit 13 corresponds to, for example, a hypervisor that is read and executed from a read only memory (ROM) (not illustrated) by the CPU 14a mounted on the SB#0. The virtualization control unit 13 executes a virtual OS 11 on both the SB#0 and the SB#1 and executes a virtual OS 12 on the SB#2. Furthermore, the virtualization control unit 13 retains data for managing hardware by using a part of the memory for its own use. The remaining memory capacity is used by the virtual OS. Because each virtual OS does not directly control the hardware mounted on the SB, each virtual OS asks the virtualization control unit 13 to perform processing.

With this configuration, the memory 14c mounted on the SB#0 stores therein a command line 14d in which a command for executing a process requested from a virtual machine operating on the information processing apparatus 10 is described. Furthermore, the memory on the SB#0 stores therein resource information 14f on the hardware resources included in the SB#0, and management information 14e on the managing of the system board included in the information processing apparatus 10.

Furthermore, the memory 15c on the SB#1 stores therein a command line 15d, in which a command that executes a process requested from a virtual machine operating on the information processing apparatus 10 is described, and resource information 15e on the hardware resources included in the SB#1. Similarly, the memory 16c on the SB#2 stores therein a command line 16d, in which a command that executes a process requested from a virtual machine operating on the information processing apparatus 10 is described, and also stores therein resource information 16e on the hardware resources included in the SB#2.

The management information 14e is data commonly shared by each system board from among data used when the virtualization control unit 13 operates. Examples of the management information 14e include data for managing a virtual OS, data exchanged between CPUs, data for managing the resource information on each system board, or the like. Furthermore, the resource information 14f, the resource information 15e, and the resource information 16e are data used by each system board from among data used when the virtualization control unit 13 operates. An example of the resource information includes data for managing or controlling a specific SB.

Then, the CPU 14a or the CPU 14b on the SB#0 executes the command line 14d stored in the memory 14c on the SB#0 and refers to the management information 14e or the resource information 14f stored in the memory 14c on the SB#0. Furthermore, the CPU 15a or the CPU 15b on the SB#1 executes the command line 15d stored in the memory 15c on the SB#1 and refers to the resource information 15e stored in the memory 15c on the SB#1. Similarly, the CPU 16a or the CPU 16b on the SB#2 executes the command line 16d stored in the memory 16c on the SB#2 and refers to the resource information 16e stored in the memory 16c on the SB#2.

With this configuration, each CPU on each SB can execute a command requested from a virtual machine operating in the information processing apparatus 10, i.e., a command received from the virtualization control unit 13 that provides a virtual machine. Specifically, if a process is received from a virtual OS via the virtualization control unit 13, each CPU on each corresponding SB can read the corresponding command from the command line stored in a corresponding memory and execute it. Furthermore, for a process performed inside an SB, each CPU on each corresponding SB can complete the process within the SB by referring to the resource information.

In this way, because a single piece of the management information 14e is used in the information processing apparatus 10, the virtualization control unit 13 is executed singularly in the information processing apparatus 10. In contrast, each CPU on each SB can operate as the virtualization control unit 13. Accordingly, in the information processing apparatus 10, it is possible to execute initialization processes in parallel, thus reducing the length of time taken before the information processing apparatus is booted up.

[b] Second Embodiment

In the following, an example case will be described with reference to FIGS. 2 to 9, in which, if an information processing apparatus is booted up, each SB is initialized.

Functional Block Diagram

Figure 2:
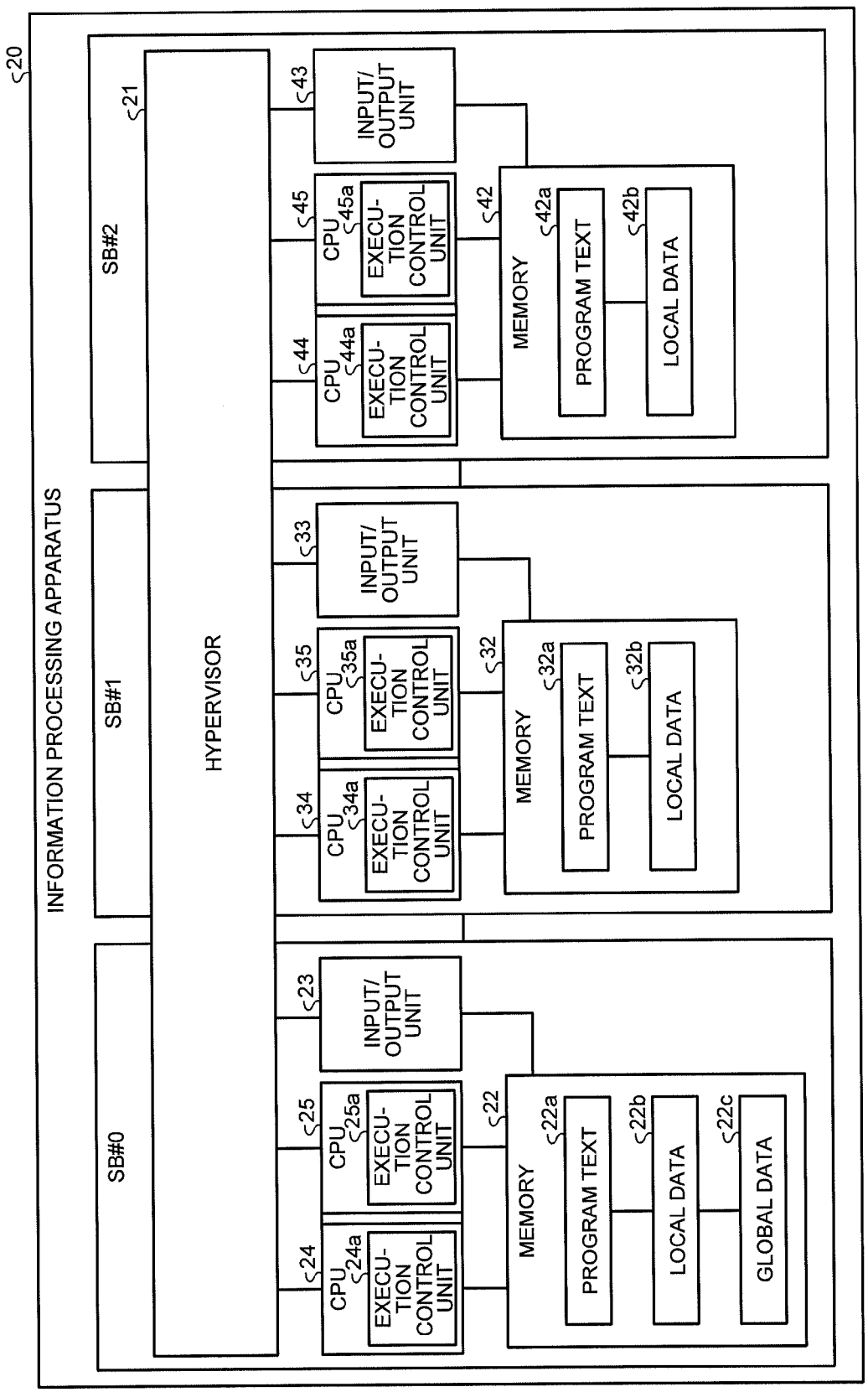
FIG. 2 is a functional block diagram illustrating the configuration of an information processing apparatus according to a second embodiment.

FIG. 2 is a functional block diagram illustrating the configuration of an information processing apparatus according to a second embodiment. As illustrated in FIG. 2, an information processing apparatus 20 includes three system boards, i.e., the SB#0, the SB#1, and the SB#2. In this example, three system boards are mounted; however, further multiple system boards may also be mounted on the information processing apparatus 20. Furthermore, in this case, it is assumed that the SB#0 is a master board that reads a program for a hypervisor from a ROM (not illustrated) and executes the program.

Furthermore, in the information processing apparatus 20, a hypervisor 21 is executed on both the SBs. The hypervisor 21 is a processing unit that is executed by a CPU 24 or a CPU 25 on the SB#0 corresponding to the master board when the information processing apparatus 20 is booted. After the booting, the hypervisor 21 reads, from the ROM, a program text in which a command line executed by the hypervisor 21 is described and creates a copy thereof. Then, the information processing apparatus 20 stores the copied program text in a memory 22 on the SB#0, in a memory 32 on the SB#1, and in a memory 42 on the SB#2.

The hypervisor 21 virtualizes the hardware included in each SB and provides a virtual OS. For example, the hypervisor 21 executes a virtual OS#1 on both the SB#0 and the SB#1, executes a virtual OS#2 on the SB#1, and executes a virtual OS#3 on the SB#2. The number of virtual OSs can be arbitrarily set.

Configuration of the SB#0

As illustrated in FIG. 2, the SB#0 includes the memory 22, an input/output unit 23, the CPU 24, and the CPU 25. The number of CPUs or the like described here is only an example; therefore, the number thereof is not limited thereto. Furthermore, in this case, a description will be given with the assumption that the CPU 24 is a master CPU that executes an initialization process on the SB#0; however, a master CPU can be arbitrarily selected from among any CPU.

The memory 22 is a storage device that stores therein a program or the like executed by the CPU 24 or the CPU 25. Specifically, the memory 22 stores therein a program text 22a, local data 22b, and global data 22c. Each piece of information is updated by the CPU 24, the CPU 25, or the like. The program text 22a is a command line in which a command for the hypervisor 21 is described.

Figure 3:
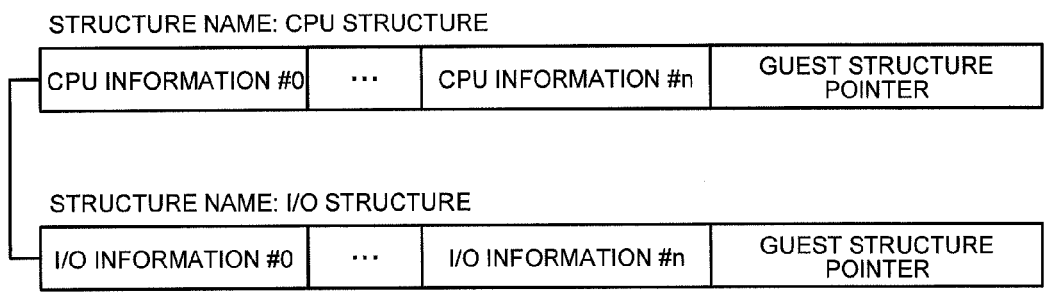
FIG. 3 is a schematic diagram illustrating an example of a structure that is stored as local data.

The local data 22b is information that is used for managing the hardware resources included in the SB#0. FIG. 3 is a schematic diagram illustrating an example of a structure that is stored as the local data 22b. As illustrated in FIG. 3, the memory 22 stores therein, as the local data 22b, a CPU structure and an I/O structure. The CPU structure is a data structure that manages the CPU resource on the SB#0 operating a virtual OS. Specifically, the memory 22 stores therein, as the local data 22b, CPU information #0 to #n (n is the number of CPUs mounted) and a guest structure pointer.

The CPU information is resource information on a CPU. For example, the CPU information corresponds to information in which an identifier for specifying a CPU is associated with an identifier for identifying a virtual OS that operates a virtual OS. Examples of the identifier that specifies a CPU include a serial number of the CPU or a unique identification number. Examples of the identifier that identifies a virtual OS include a guest ID allocated to a virtual OS that operates as a guest OS. The guest structure pointer is a pointer that associates the CPU structure of the local data 22b with the guest structure stored in the global data 22c. The local data 22b also includes an m-block structure that is a data structure that manages free space of a memory.

The I/O structure is a data structure that manages the input/output resources on the SB#0 to which a virtual OS is allocated. Specifically, the memory 22 stores therein, as the local data 22b, I/O information #0 to #n (n is the number of I/Os mounted) and a guest structure pointer. The I/O information is input/output resource information and is, for example, information in which an identifier for specifying an input/output unit is associated with an identifier for specifying a virtual OS that uses the input/output unit. Examples of the identifier for specifying the input/output unit include a serial number of the input/output unit or a unique identification number.

Figure 4:
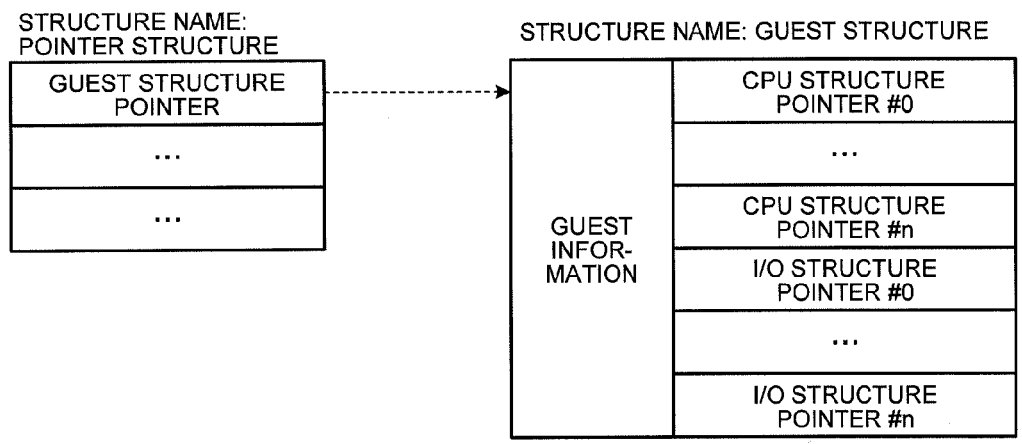
FIG. 4 is a schematic diagram illustrating an example of a structure that is stored as global data.

The global data 22c is management information that is used for managing a system board included in the information processing apparatus 20, i.e., information that is used for managing the entire information processing apparatus 20. FIG. 4 is a schematic diagram illustrating an example of a structure that is stored as the global data 22c. As illustrated in FIG. 4, the memory 22 stores therein, as the global data 22c, pointer structures and guest structures in an associated manner. The pointer structure is information indicating a guest structure pointer included in the CPU structure. The guest structure is a data structure that manages each virtual OS and is associated with each guest structure pointer stored in the pointer structure.

The guest structure is constituted by the guest information, the CPU structure pointer, and the I/O structure pointer. The guest information is an identifier for identifying a virtual OS. An example of the guest information includes a guest ID that is allocated to a virtual OS operating as a guest OS. The CPU structure pointer is a pointer that specifies CPU information used by a virtual OS. The I/O structure pointer is a pointer that specifies an I/O used by a virtual OS. The global data 22c also includes data that manages a virtual OS, information that is received and transmitted between CPUs, and data that manages local data.

Furthermore, the global data 22c also includes information on the configuration of the information processing apparatus 20. Examples of the configuration information include the number of SBs that can be mounted, the number of SBs that is currently mounted, and the type or the number of the hardware mounted on each SB. The configuration information may also be updated by a master CPU mounted on a master board or may also be manually updated by an administrator.

The global data 22c described above is data that is used to manage or control the entire system and is arranged on the master board. The amount of the global data 22c is constant during the operation of the system and does not vary even if the configuration is dynamically changed. Furthermore, once the global data 22c is allocated, it locates at the same location during the operation of the system and does not move.

By using the guest structure pointer stored in the local data 22b in this way, the pointer structure in the global data 22c can be specified. Furthermore, by using the pointer structure in the global data 22c, the guest information on the guest structure in the global data 22c can be specified. Furthermore, by using, for example, a CPU structure pointer #0 associated with the guest information in the guest structure in the global data 22c, the CPU information #0 on the CPU structure in the local data 22b can be specified.

Referring back to FIG. 2, the input/output unit 23 is a processing unit that executes an input/output of data. Examples of the input/output unit 23 include a communication interface, such as a network interface card (NIC), or an input/output interface, such as a disk.

The CPU 24 is a processing unit that manages the entire SB#0, includes an execution control unit 24a, and is a master CPU that executes the initialization process on the SB#0. The execution control unit 24a is a processing unit that executes the initialization of the SB#0. Specifically, if the program text 22a is stored in the memory 22 by the hypervisor 21, the execution control unit 24a executes an initialization command stored in the program text 22a, creates the local data 22b, and stores it in the memory 22. Then, after local data is created in each SB, the execution control unit 24a creates the global data 22c and stores it in the memory 22.

Specifically, if the execution control unit 24a detects that the program text 22a is stored, the execution control unit 24a reads, from the program text 22a, an initialization command that is used to create the local data 22b and executes the initialization command. By executing the initialization command, the execution control unit 24a collects information on the hardware included in the SB#0 to acquire the number of CPUs mounted on the SB#0, a serial number thereof, the number of memories, or a serial number thereof. Then, the execution control unit 24a creates the local data 22b, in which a CPU structure is associated with a given guest structure pointer, and stores the local data 22b in the memory 22. The information on the hardware may be obtained by scanning setting information on the SB#0. Alternatively, information specified by an administrator may also be used as the information on the hardware.

Thereafter, the execution control unit 24a waits until local data is created in each SB. Then, if the execution control unit 24a detects that the local data is created in each SB, the execution control unit 24a reads, from the program text 22a, an initialization command that creates the global data 22c and executes the initialization command. The execution control unit 24a collects the CPU information on each local data and specifies each CPU that is used by each guest OS. Specifically, the execution control unit 24a creates the association relationship between each guest OS and each CPU or I/O used by the associated guest OS, i.e., creates a guest structure. Then, the execution control unit 24a creates the global data 22c by associating the guest structure pointer stored in a local disk with the guest information stored in the guest structure and stores the global data 22c in the memory 22.

The CPU 25 is a processing unit that manages the entire SB#0 and includes an execution control unit 25a. The CPU 25 and the execution control unit 25a execute the same process as that performed by the CPU 24 and the execution control unit 24a. The CPU 25 operates as a master CPU if abnormality occurs in the CPU 24 that functions as a master CPU.

Configurations of the SB#1 and the SB#2 In the following, the configurations of the SB#1 and the SB#2 will be described. The configuration of the SB#1 is the same as that of the SB#2; therefore, the configuration of the SB#1 will be described as an example. As illustrated in FIG. 2, similarly to the SB#0, the SB#1 includes the memory 32, an input/output unit 33, a CPU 34, and a CPU 35. The number of CPUs or the like is only an example and is not limited thereto. Furthermore, in this case, a description will be given with the assumption that the CPU 34 is a master CPU that executes the initialization process on the SB#1; however, a master CPU can be arbitrarily selected from among any CPU.

The memory 32 is a storage device that stores therein a program or the like that is executed by the CPU 34 or the CPU 35. Specifically, the memory 32 stores therein a program text 32a and local data 32b. Each piece of information is updated by the CPU 34, the CPU 35, or the like. The program text 32a is a command line in which a command for the hypervisor 21 is described and the content thereof is the same as that of the program text 22a stored in the memory 22 on the SB#0.

The local data 32b is information that manages the hardware resources included in the SB#1. The local data 32b stores therein the same information as that illustrated in FIG. 3. Specifically, the local data 32b has a data structure that manages the CPU resource or the I/O resource on the SB#1 operating a virtual OS.

The input/output unit 33 is a processing unit that executes an input/output of data. Examples of the input/output unit 33 include a communication interface, such as a NIC, or an input/output interface, such as a disk.

The CPU 34 is a processing unit that manages the entire SB#1, includes an execution control unit 34a, and is a master CPU that executes the initialization process on the SB#1. The initialization process executed by the execution control unit 34a is the same as that executed on the local data by the execution control unit 24a mounted on the SB#0; therefore, a description thereof will be omitted.

The CPU 35 is a processing unit that manages the entire SB#1 and includes an execution control unit 35a. The CPU 35 and the execution control unit 35a execute the same process as that performed by the CPU 34 and the execution control unit 34a. Furthermore, the CPU 35 operates as a master CPU if abnormality occurs in the CPU 34 that functions as a master CPU.

Flow of a Process

In the following, the flow of a process performed by the information processing apparatus 20 illustrated in FIG. 2 will be described. Specifically, the flow of a boot-up process and an SB initialization process will be described.

Flow of a Boot-Up Process

Figure 5:
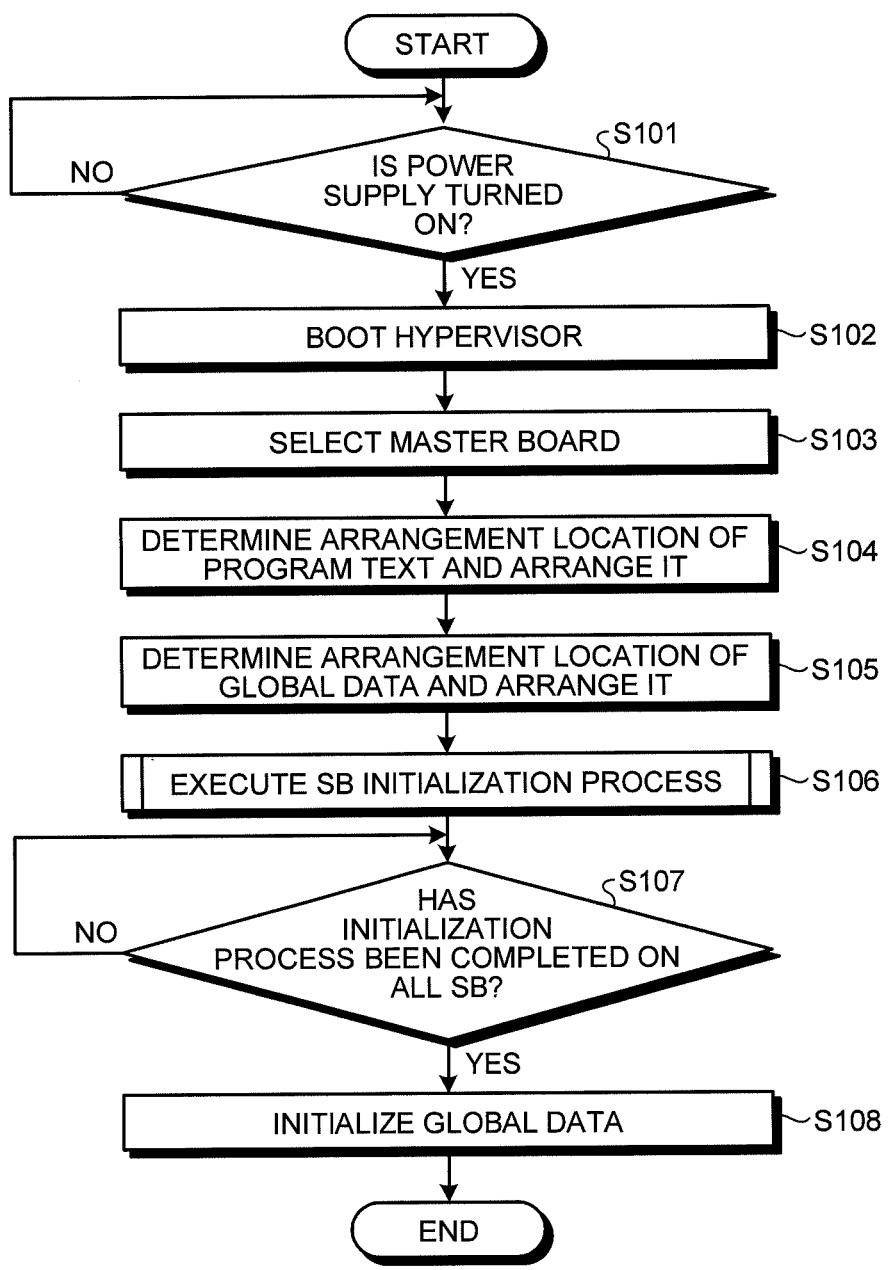
FIG. 5 is a flowchart illustrating the flow of a boot-up process performed by the information processing apparatus according to the second embodiment.

FIG. 5 is a flowchart illustrating the flow of a boot-up process performed by the information processing apparatus according to the second embodiment. As illustrated in FIG. 5, if a power supply of the information processing apparatus 20 is turned on (Yes at S101), a CPU included in the information processing apparatus 20 reads, from the ROM, a program in the hypervisor 21 and executes the program to boot the hypervisor 21 (S102).

Subsequently, the hypervisor 21 selects a master board (S103). For example, the hypervisor 21 selects one master board from among multiple SBs in accordance with the condition that is previously determined. The hypervisor 21 may also select, as a master board, an SB having the minimum identification number from among identification numbers contained in the SBs. Furthermore, the hypervisor 21 may also select, as a master board, an SB having mounted thereon a CPU that has the minimum identification number from among the identification numbers contained in the CPUs. Furthermore, a variable is prepared in a memory region, the hypervisor 21 may also select, as a master board, an SB having mounted thereon a CPU that updates the variable for the first time. However, it is preferable to select an SB having a memory capacity capable of arranging the global data. In this case, the SB#0 is assumed to be selected as a master board.

Thereafter, the hypervisor 21 determines the arrangement location of a program text and arranges the program text (S104). Specifically, in order to copy the program text for the hypervisor stored in the ROM to distribute it to each SB, the hypervisor 21 determines which location of the memory address in the SB is used. For example, the hypervisor 21 determines, to be the arrangement location, a memory region whose location in an SB is relatively the same from among all of the SBs and whose capacity used to store the program text can be successively reserved. Furthermore, the hypervisor 21 may also determine, to be the arrangement location for each SB, a memory region whose memory capacity used to store the program text can be successively reserved.

Subsequently, the hypervisor 21 determines the arrangement location of the global data and arranges the global data (S105). Specifically, the hypervisor 21 determines, in the memory on the master board, the arrangement location of the global data. For example, the hypervisor 21 determines, in the memory 22 mounted on the SB#0, a region in which the global data can be successively stored to be the arrangement location.

Then, after an SB initialization process is executed on in each SB (S106), if the SB initialization process for each SB ends (Yes at S107), the execution control unit 24a in the CPU 24 on the SB#0 corresponding to the master board executes the initialization of the global data 22c (S108).

Flow of an SB Initialization Process

Figure 6:
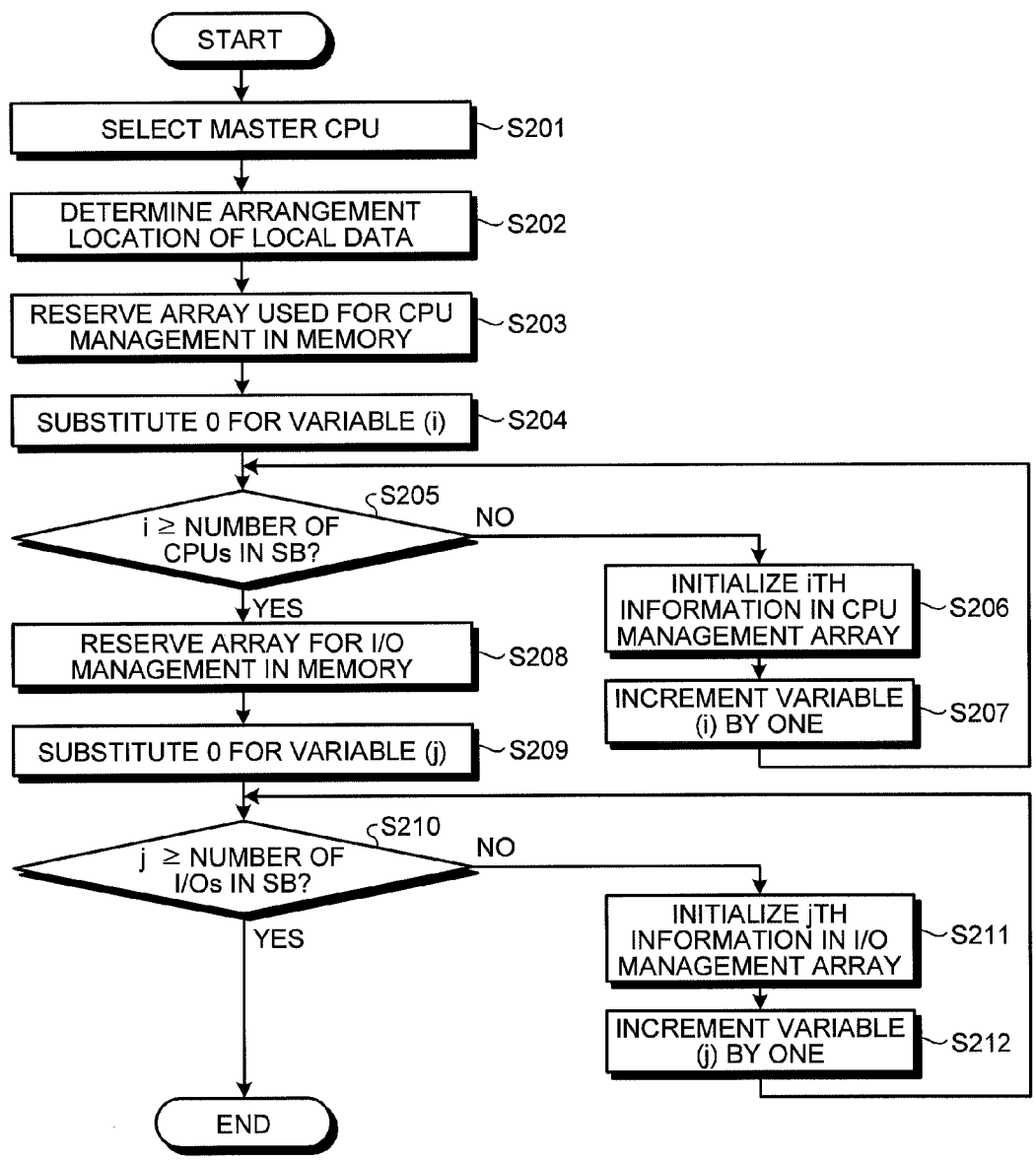
FIG. 6 is a flowchart illustrating the flow of an SB initialization process performed by the information processing apparatus according to the second embodiment.

FIG. 6 is a flowchart illustrating the flow of the SB initialization process performed by the information processing apparatus according to the second embodiment. As illustrated in FIG. 6, in each SB, a master CPU is selected (S201) and the execution control unit in the selected master CPU determines the arrangement location of the local data (S202). For example, in each SB, a CPU having the minimum identification number is determined to be a master CPU. Furthermore, the master CPU in each SB may also determine a given location in a memory in each SB to be the arrangement location of the local data. Furthermore, the master CPU on each SB may also determine, to be the arrangement location, a region whose location in an SB is relatively the same from among all of the SBs and can be successively reserved.

Subsequently, the master CPU reserves an array used for CPU management in a memory (S203). Specifically, the master CPU reserves, in the memory, the array in which the CPU structure illustrated in FIG. 3 is stored.

Then, the master CPU substitutes 0 for a variable (i) (S204) and determines whether the variable (i) is equal to or greater than the number of CPUs in the SB (S205). Then, if the variable (i) is less than the number of CPUs in the SB (No at S205), the master CPU initializes $i^{th}$ information in the CPU management array (S206). Specifically, the master CPU creates CPU information #i in the CPU structure illustrated in FIG. 3. Then, the master CPU increments the variable (i) by one (S207), returns to S205, and executes the process at Step S205 and the subsequent processes.

Thereafter, if the variable (i) becomes equal to or greater than the number of CPUs on the SB (Yes at S205), the master CPU reserves the array for the I/O management in a memory (S208). Specifically, the master CPU reserves, in the memory, the array for storing the I/O structure illustrated in FIG. 3.

Subsequently, the master CPU substitutes 0 for a variable (j) (S209), and determines whether the variable (j) is equal to or greater than the number of I/Os on the SB (S210). If the variable (j) is less than the number of I/Os on the SB (No at S210), the master CPU initializes $j^{th}$ information in the I/O management array (S211). Specifically, the master CPU creates I/O information #j in the I/O structure illustrated in FIG. 3. Then, after the master CPU increments the variable (j) by one (S212), returns to S210, and executes the process at S210 and the subsequent processes. Thereafter, if the variable (j) becomes the number of I/Os on the SB (Yes at S210), the master CPU ends the process. In this case, a description has been given of a case in which the CPU structure is created first; however, the I/O structure may also be created first.

Specific Example

Figure 7:
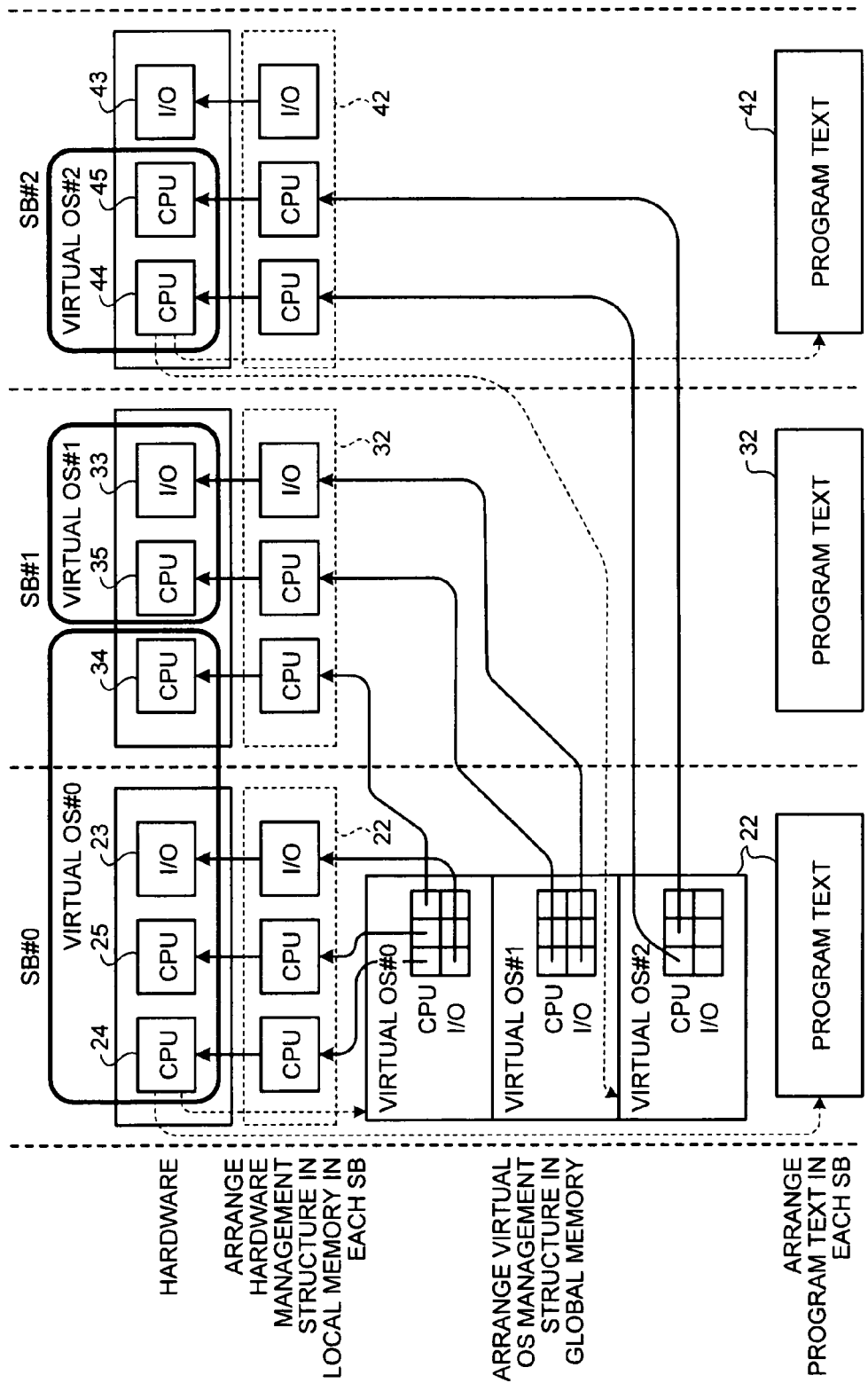
FIG. 7 is a schematic diagram illustrating a specific example of the initialization.

In the following, a specific example of the initialization described above will be described. FIG. 7 is a schematic diagram illustrating a specific example of the initialization. FIG. 7 illustrates the relationship between the local data and the global data when they manage various kinds of information if the hardware included in each SB is virtualized and operates a virtual OS. In FIG. 7, each SB includes two CPUs (24 and 25, 34 and 35, or 44 and 45) and one memory (22, 32, or 42).

In this state, first, a hypervisor stores, in each memory (22, 32, or 42) on each SB, a copy of the program text in which a command line that is stored in a ROM or the like and that is executed by the hypervisor is described. Furthermore, the hypervisor has structures for virtualizing the hardware resources. These structures are associated with the hardware resources one by one. Accordingly, each of the execution control units in each SB creates a CPU structure and an I/O structure indicating these relationships and retains them as local data in each memory (22, 32, or 42) on each SB.

Subsequently, the virtual OS is executed. In this case, two CPUs (24 and 25) and one memory 22 on the SB#0 operate a virtual OS#0 by cooperating with one CPU 34 on the SB#1. Furthermore, on the SB#1, a virtual OS#1 operates by using one CPU 35 and one memory 32. Furthermore, a virtual OS#2 operates by using two CPUs (44 and 45) on the SB#2.

By doing so, the execution control unit on the master board creates, as the global data, the relationship between the virtual OS and the hardware that is used by the virtual OS. Specifically, the execution control unit on the master board creates information that specifies a virtual OS operated by a CPU or an I/O stored as local data in each SB.

Specifically, the execution control unit on the master board creates information indicating that the virtual hardware allocated to the virtual OS#0 is constituted by two CPUs (24 and 25) on the SB#0, by one CPU 34 on the SB#1, and by one I/O 23 on the SB#0. Similarly, the execution control unit on the master board creates information indicating that the virtual hardware allocated to the virtual OS#1 is constituted by one CPU 35 and one I/O 33 on the SB#1. Similarly, the execution control unit on the master board creates information indicating that the virtual hardware allocated to the virtual OS#2 is constituted by two CPUs (44 and 45) on the SB#2.

In this way, the information processing apparatus according to the second embodiment arranges a program text for a hypervisor to each SB and stores, in a memory in each SB, the local data that corresponds to information used within each SB. Furthermore, the information processing apparatus according to the second embodiment stores, in the memory on the master board, the global data, such as the information used both SBs, information that associates each SB, common information on each SB, and information on the virtual OS. Accordingly, the information processing apparatus retains the local data, the number of which corresponds to the number of SBs currently mounted on the information processing apparatus, and one global data.

Comparison

Figure 8:
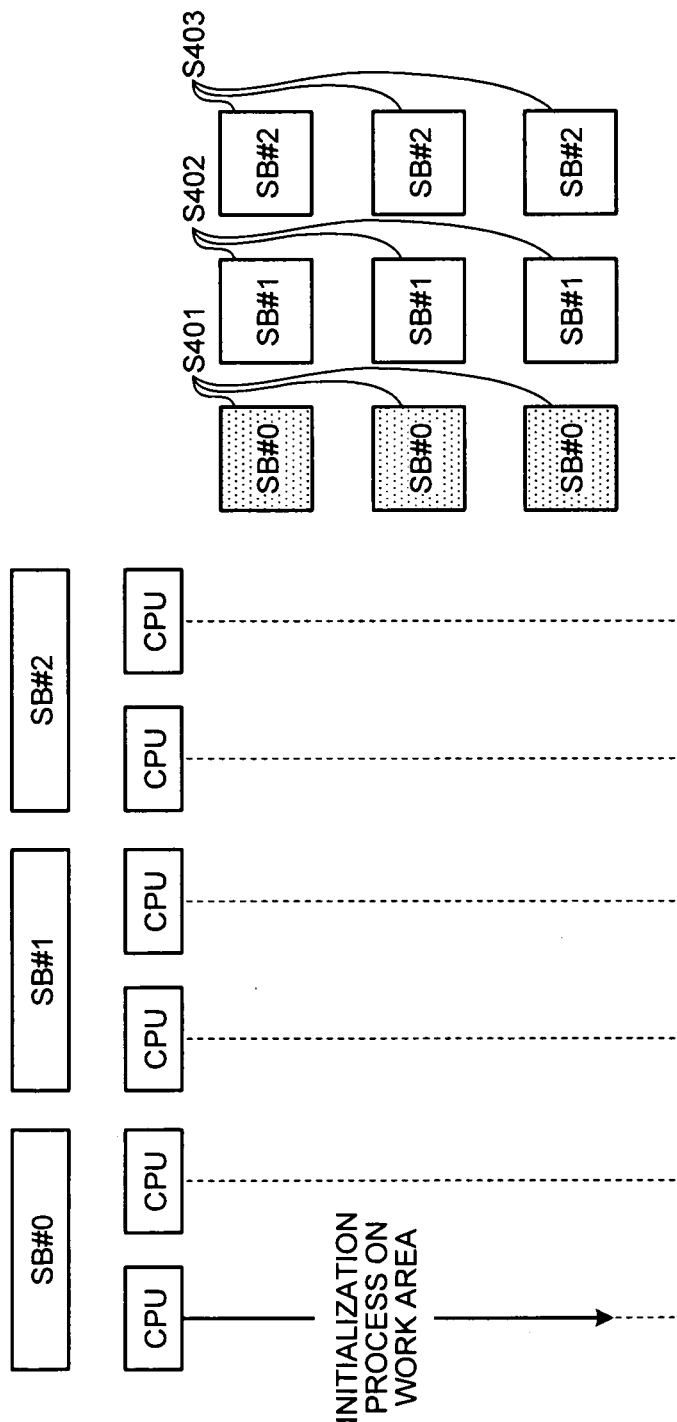
FIG. 8 is a sequence diagram illustrating a boot sequence of an information processing apparatus according to a conventional technology.
Figure 9:
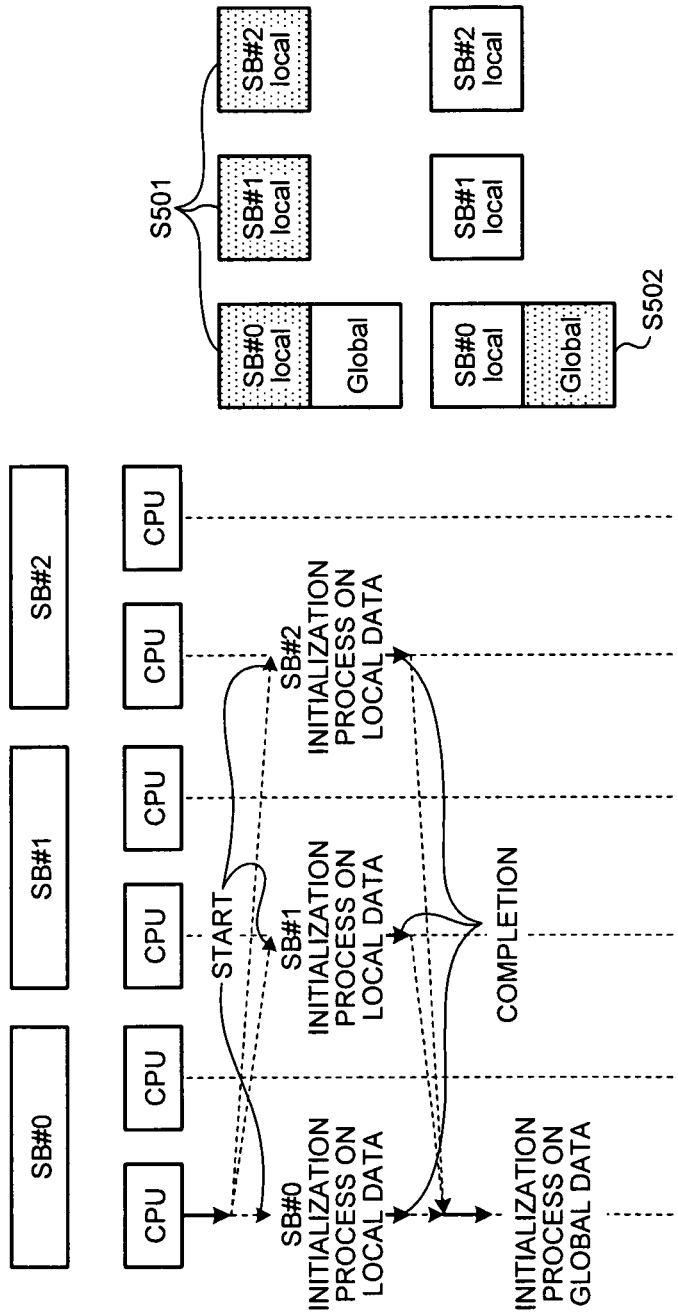
FIG. 9 is a sequence diagram illustrating a boot sequence of the information processing apparatus according to the second embodiment.

In the following, a case will be described in which the length of the boot time of the information processing apparatus can be reduced by implementing the embodiment described above. FIG. 8 is a sequence diagram illustrating a boot sequence of an information processing apparatus according to a conventional technology. FIG. 9 is a sequence diagram illustrating a boot sequence of the information processing apparatus according to the second embodiment.

Figure 14:
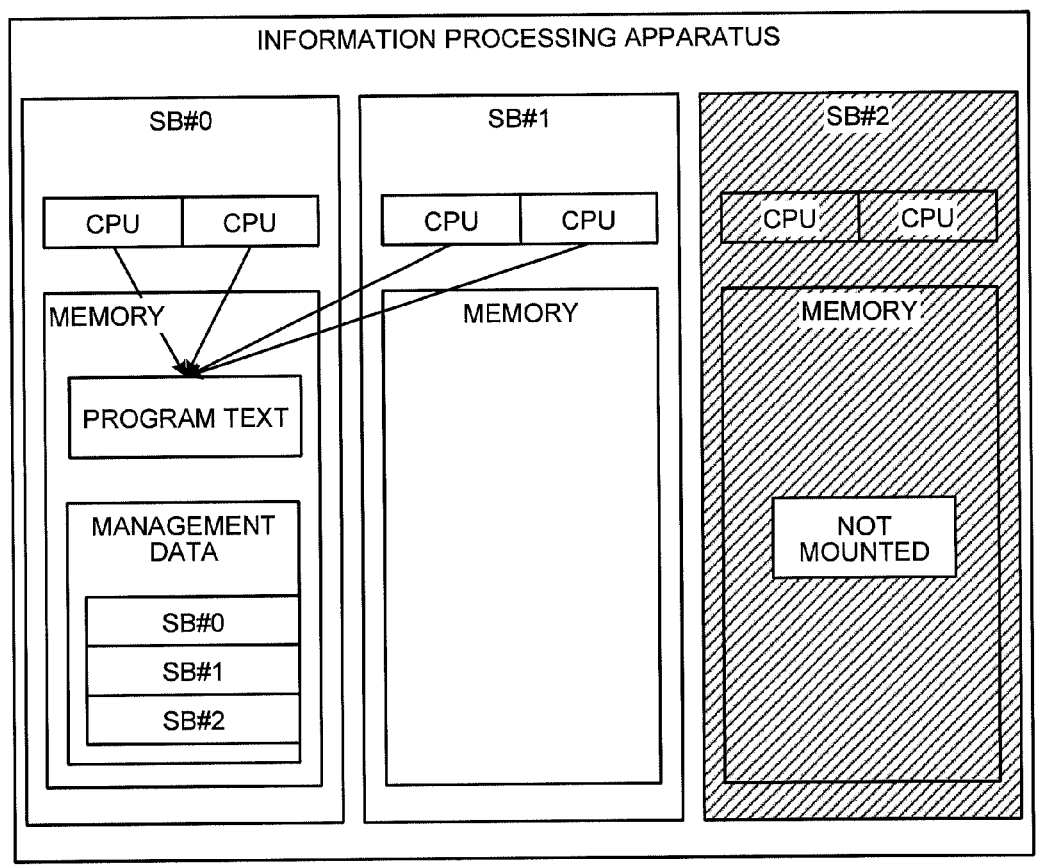
FIG. 14 is a schematic diagram illustrating an example of a conventional virtualization system.

As illustrated in FIG. 14, with a conventional information processing apparatus, a program text, local data, and global data are arranged on the SB#0. Specifically, with the conventional information processing apparatus, because a work area of a hypervisor is arranged regardless of the SBs, a single CPU in a work area executes the initialization process. For example, as illustrated in FIG. 8, the SB#0 sequentially executes the initialization of the SB#0 (S401), the initialization of the SB#1 (S402), and the initialization of the SB#2 (S403). The down arrow indicates the passage of time.

In contrast, with the information processing apparatus according to the embodiments described above, a program text and local data are arranged in each SB. Specifically, with the information processing apparatus according to the second embodiment, because a part of a work area for a hypervisor is allocated to each SB, from among the processes in the initialization process, a portion that can be executed in parallel by each SB occurs. For example, as illustrated in FIG. 9, the SB#0, the SB#1, and the SB#2 execute, in parallel, the initialization of the local data (S501). Then, the SB#0 executes the initialization of the global data (S502). The down arrow indicates the passage of time.

In this way, as can be seen by comparing FIG. 8 with FIG. 9, the information processing apparatus according to the embodiments described above can execute the initialization of the local data in parallel, thus reducing the time taken to initialize the SB.

[c] Third Embodiment

In the second embodiment, the initialization process performed by each SB has been described; however, the information processing apparatus according to the embodiments described above is not limited to the initialization process. Accordingly, in a third embodiment, a description will be given of the flow of a normal process other than the initialization process and a process for adding an OS. The configuration of the information processing apparatus according to the third embodiment is the same as that of the information processing apparatus 20 described in the second embodiment.

Flow of a Normal Process

Figure 10:
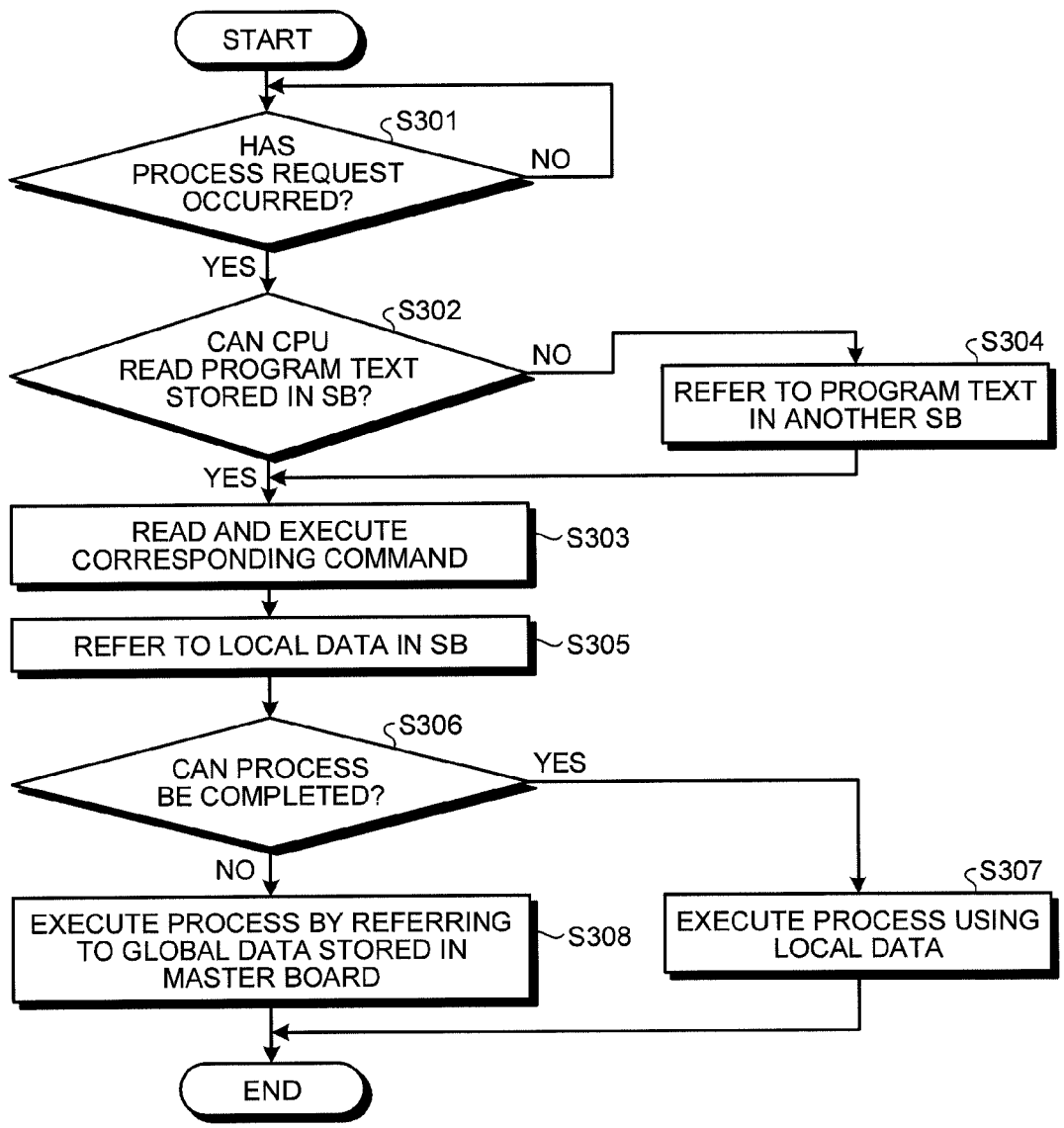
FIG. 10 is a flowchart of a normal process performed by an information processing apparatus according to a third embodiment.

FIG. 10 is a flowchart of a normal process performed by an information processing apparatus according to a third embodiment. As illustrated in FIG. 10, if a process request occurs in any one of the SBs in the information processing apparatus 20 (Yes at S301), the CPU of the subject SB determines whether the CPU can read the program text stored in the subject SB (S302).

Subsequently, if the CPU of the subject SB determines that the CPU can read the program text stored in the subject SB (Yes at S302), the CPU reads the corresponding command from the program text in the memory on the subject SB and executes the command (S303). In contrast, if the CPU of the subject SB determines that the CPU does not read the program text stored in the subject SB (No at S302), the CPU of the subject SB refers to a program text stored in a memory mounted on the other SB (S304), reads the corresponding instruction from the program text stored in the corresponding SB, and executes it (S303).

Then, the CPU of the SB that executes the instruction refers to local data in the memory included in the subject SB (S305) and determines whether the process can be completed by using the local data (S306).

If the CPU of the subject SB determines that the process can be completed using the local data (Yes at S306), the subject CPU executes the process using the referred local data (S307). In contrast, if the CPU of the subject SB determines that the process is not completed with the local data (No at S306), the subject CPU executes the process by referring to the global data stored in the memory on the master board (S308).

In general, if an OS requests a process from the hypervisor 21, the OS executes a command line of a program text for the hypervisor 21 by upgrading the privilege level of the CPU that is executing the OS to a hypervisor privilege. At this time, the CPU that executes the OS is used without being changed. In the example illustrated in FIG. 10, if a process is requested from the OS to the hypervisor 21, the hypervisor 21 starts the process by using the program text stored in the subject SB. If the hypervisor 21 can complete the requested process by using the local data, the hypervisor 21 sends a response to the OS without accessing other SBs. Furthermore, if the global data is used for the requested process, the hypervisor 21 refers to or updates the global data stored in the master board to execute the process. Accordingly, if the process is executed in a CPU on a system board other than the master board, memory access is performed using the other SB in order to refer to the global data.

For example, if the CPU 34 on the SB#1 receives a processing request from the OS, the CPU 34 reads the program text 32a in the memory 32 on the SB#1 to execute the subject command. Then, the CPU 34 on the SB#1 refers to the local data 32b to execute the process. At this time, if the CPU 34 on the SB#1 does not complete the process with the local data 32b, the CPU 34 refers to the global data 22c on the SB#0.

Operation of New OS

Figure 11:
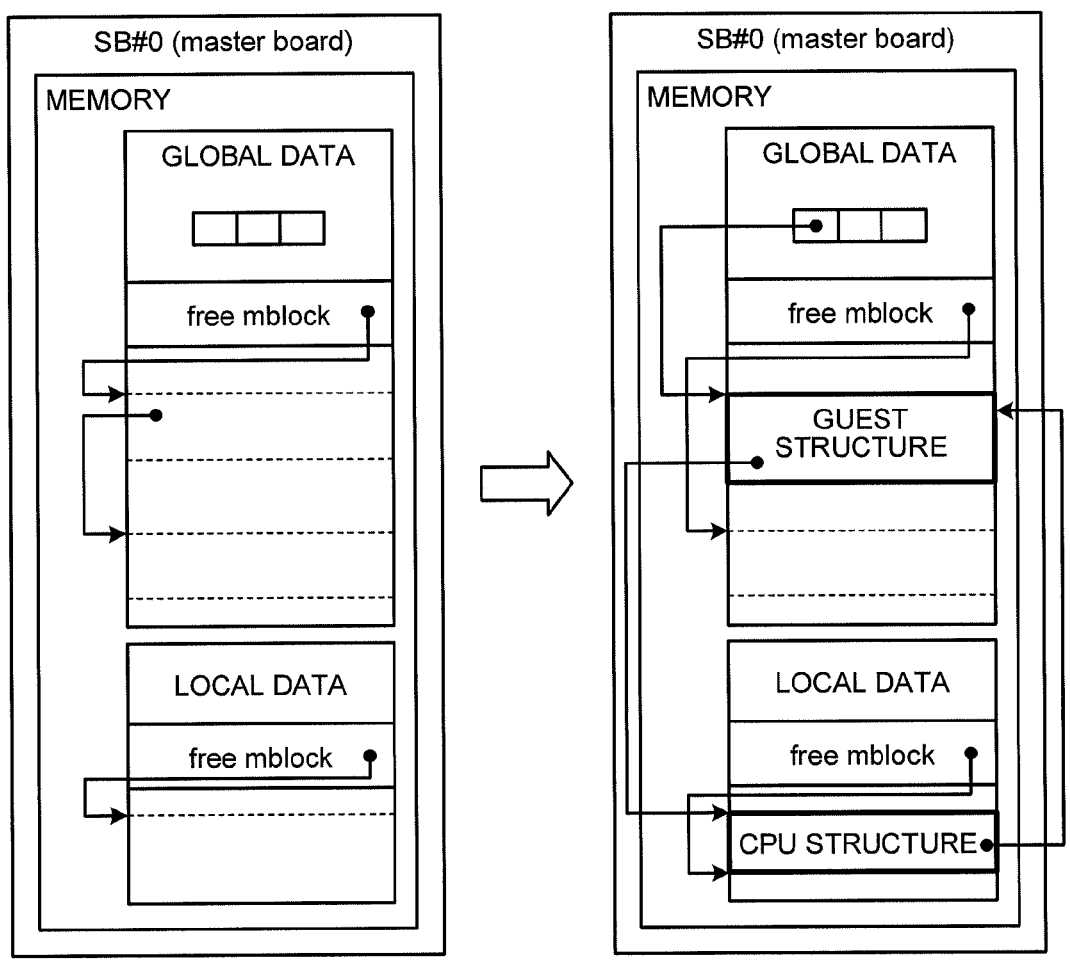
FIG. 11 is a schematic diagram illustrating a process example of a master board when a new OS is operated.

FIG. 11 is a schematic diagram illustrating a process example of a master board when a new OS is operated. If a new OS is booted in the information processing apparatus 20, the CPU on the master board cuts out, from a free memory area in the local data, the global data and the data structure that manages the new OS; initializes them; and associates them with the data structure managed by the hypervisor 21.

As illustrated in FIG. 11, first, the CPU 24 on the SB#0 corresponding to the master board allocates a guest structure that is used to manage the new OS and a data structure that is used to manage the CPU used by the new OS. Specifically, the CPU 24 on the SB#0 creates a guest structure by searching global data 22c for a free area (free mblock) and creates a CPU structure by searching the local data 22b for a free area (free mblock). Then, the CPU 24 on the SB#0 links the guest structure to the CPU structure using a pointer and associates the guest structure with each guest structure provided by the hypervisor. The CPU structure is used as an example here; however, the CPU 24 on the SB#0 similarly executes the above process on the I/O structure.

Addition and Deletion of an SB

If a new SB is added, the CPU 24 on the SB#0 corresponding to the master board adds management information on the new SB as the global data and stores the program text in a memory on the new SB.

For example, the CPU 24 on the SB#0 creates a copy of the program text stored in the SB#0 or the program text that is read from the ROM and stores the created program text in a memory on the SB#3 that is newly added. Subsequently, the CPU 24 on the SB#0 issues an initialization command to the CPU on the SB#3.

Then, in a similar manner as in the second embodiment, the CPU on the SB#3 executes the initialization command from the program text stored in the memory and creates the local data in the memory. Thereafter, the CPU 24 on the SB#0 stores, in the global data 22c, information or the like that indicates the storing location of the local data on the SB#3. Furthermore, if the existing SB#2 is deleted, the CPU 24 on the SB#0 deletes information on the SB#2, such as the CPU structure pointer for the guest structure or the I/O structure pointer, stored in the global data 22c.

Example of Deleting Memory Capacity

FIG. 12 is a schematic diagram illustrating a case in which memory capacity can be reduced. In the following, a description will be given of memory usage used in a system in which four 16-core CPUs can be mounted on a single SB and the maximum of 16 SBs can be mounted.

As illustrated in FIG. 12, with this information processing apparatus, the amount of global data is constant regardless of the number of SBs mounted, and the amount of local data increases as the number of SBs mounted increases. For example, if a single SB is mounted, the amount of local data is 74.2 MB and the amount of global data is 1191.5 MB. Accordingly, a total of 1265.7 MB memory area is reserved in the memory.

With a conventional technology, a total of 2378.7 MB memory area is always reserved in a hypervisor regardless of the number of SBs. Specifically, with the conventional technology, "total (MB)=2378.7 MB" corresponding to the "number of SBs is 16" illustrated in FIG. 12 is reserved in the memory on the SB#0.

In contrast, by using the method described in the first embodiment or the second embodiment, as illustrated in FIG. 12, if a single SB is mounted, the memory usage of the hypervisor can be reduced to 1265.7 MB. Specifically, if a single SB is mounted, when compared with the conventional technology, the amount of memory usage can be reduced by about 50%.

As described above, by arranging the program text for the hypervisor in each SB, the number of copies of the program text corresponding to the number of SBs is present in the system. Accordingly, when some CPU performs a process for hypervisor, by using a copy of a program code stored in the SB that includes the subject CPU, the reading speed of a program line is improved and thus the processing time is reduced. Furthermore, even if a program text stored in an SB is crashed, by using a program text stored in another SB, a system down due to a failure of an SB is less likely to occur, thus the availability or the reliability is improved.

Specifically, the program codes copied between SBs are logically the same; however, the program codes differs physically. Accordingly, the availability or the availability can be improved by cooperatively operating multiple hypervisors. For example, even if the CPU on the SB#1 becomes the state in which the CPU on the SB#1 does not read a program text stored in the SB#1, the CPU on the SB#1 can execute processing by reading a program text stored in the other SB.

Furthermore, the number of pieces of the local data may be the number of SBs currently used instead of the maximum number of SBs designed in a system. Furthermore, the memory resource that manages an SB that is added or is deleted due to a dynamic change is reserved on the subject SB. Furthermore, because the memory resource that is used by a hypervisor by itself is divided into the global data and the local data, information used to associate them is arranged in the global data. If an increase in SB due to a dynamic change is taken into consideration, the amount of storage space corresponding to the maximum system configuration needs to be reserved. However, with the information processing apparatus according to the embodiments described above, the amount of space in which the location of the local data can be recorded is reserved in the global data. This amount is so small that can be ignored when compared it with the memory resource.

The data that records the location of the local data reserved in the global data is recorded when a hypervisor is booted or when an SB is added due to the dynamic change. Furthermore, if an SB is deleted due to a dynamic change, a pointer that is stored in the global data and that records the location of the local data is made invalid.

[d] Fourth Embodiment

In the above explanation, a description has been given of the embodiments according to the present invention; however, the embodiments are not limited thereto and can be implemented with various kinds of embodiments other than the embodiments described above. Therefore, another embodiment will be described below.

System

Of the processes described in the embodiments, the whole or a part of the processes that are mentioned as being automatically performed can also be manually performed, or the whole or a part of the processes that are mentioned as being manually performed can also be automatically performed using known methods. Furthermore, the flow of the processes, the control procedures, the specific names, and the information containing various kinds of data or parameters indicated in the above specification and drawings can be arbitrarily changed unless otherwise stated.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. Furthermore, all or any part of the processing functions performed by each device can be implemented by a CPU and by programs analyzed and executed by the CPU or implemented as hardware by wired logic.

Hardware

Figure 13:
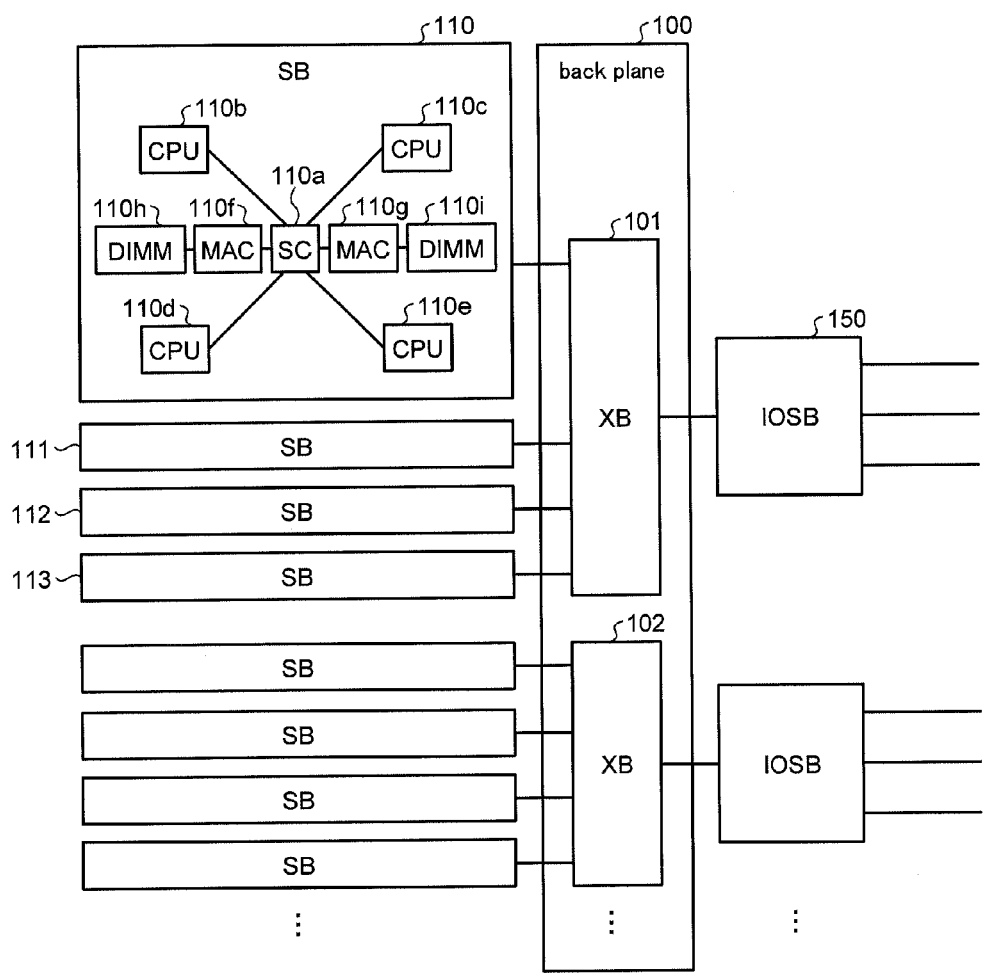
FIG. 13 is a schematic diagram illustrating a configuration example of hardware of the information processing apparatus.

The configuration of the hardware of the information processing apparatus described in the first, second, third embodiments will be described. FIG. 13 is a schematic diagram illustrating a configuration example of the hardware of the information processing apparatus. As illustrated in FIG. 13, the information processing apparatus includes, in a back plane 100, multiple crossbar switches, such as an XB 101 and an XB 102. Each of the crossbar switches are connected to SBs 110 to 113, as system boards, and also connected to an input/output system board (IOSB) 150. Furthermore, the number of crossbar switches, system boards, input/output system boards is only for an example; therefore, the configuration is not limited thereto.

The back plane 100 is a circuit board that forms buses that connect multiple connectors. The XB 101 and the XB 102 are switches that dynamically select path of data exchanged between the system boards and the input/output system board.

The SBs 110 to 113 that are connected to the XB 101 and the XB 102, respectively, are electronic circuit boards constituting electronic devices and have the same configuration; therefore, only the configuration of the SB 110 will be described here. The SB 110 has a system controller (SC) 110a, four CPUs, two memory access controllers (MAC), and two dual inline memory modules (DIMM).

The SC 110a performs the overall control of the SB 110 by controlling a process for a data transfer among CPUs 110*b* to 110*e* mounted on the SB 110, a MAC 110*f*, and a MAC 110*g*. The CPUs 110*b* to 110*e* are connected to other electronic devices via the SC 110*a* and are processors that implement the control of the caches disclosed in the first to third embodiments. The MAC 110*f* is connected between a DIMM 110*h* and the SC 110*a* and controls access to the DIMM 110*h*. The MAC 110*g* is connected between a DIMM 110*i* and the SC 110*a* and controls access to the DIMM 110*i*. The DIMM 110*h* is connected to other electronic device via the SC 110*a*. The DIMM 110*h* is a memory module that has a memory mounted on it and is used to add a memory. The DIMM 110*i* is connected to other electronic devices via the SC 110*a*. The DIMM 110*i* is a memory module that has a memory mounted on it and is used to add a memory.

The IOSB 150 is connected to the SBs 110 to 113 via the XB 101 and is also connected to an input/output device via a small computer system interface (SCSI), a fibre channel (FC), an Ethernet (registered trademark), or the like. Each IOSB 150 controls a process for a data transfer between the input/output device and the XB 101. The electronic devices, such as the CPUs, the MACs, the DIMMs, or the like, mounted on the SB 110 are only an example; therefore, the type or the number of electronic devices is not limited to those illustrated in the drawing.

According to an aspect of the present invention, the length of time taken to boot a system can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus that includes a first system board including a first processor and a second system board including a second processor, the first processor or the second processor operating as a virtualization control unit that operates virtual machines by virtualizing hardware resources included in the first system board and the second system board, wherein
   the first system board includes
      a first storing unit that stores therein first resource information, which is information used by the first processor operating as the virtualization control unit by executing a program text, and
      a management information storing unit that stores therein management information including information about the system boards included in the information processing apparatus, the information being commonly shared by each of the system boards-among information used when the virtualization control unit operates, and
   the second system board includes a second storing unit that stores therein second resource information, which is information used by the second processor operating as the virtualization control unit by executing the program text,
   wherein the virtualization control unit performs an initialization process including:
      storing the program text in the first storing unit and the second storing unit, the program text including an initialization program, and
      making the first processor and the second processor respectively execute in parallel the initialization program stored in the first storing unit and the second storing unit, wherein in the initialization process, the first processor stores in the first storing unit, as the first resource information, information that associates the hardware resources included in the first system board and virtualized hardware resources, the second processor stores in the second storing unit, as the second resource information, information that associates the hardware resources included in the second system board and virtualized hardware resources, and the first processor stores in the management information storing unit, as the management information, storing locations of the first resource information and the second resource information, and
   wherein when the second processor executes a command read from the program text stored in the second storing unit, and when information referred to by the command is not stored in the second resource information in the second storing unit, the second processor refers to the management information stored in the management information storing unit.

2. The information processing apparatus according to claim 1, wherein when a third system board including a third processor is added to the information processing apparatus, the first processor performs an initializing process including:
   storing the program text in a third storing unit included in the third system board, the program text including the initialization program, and
   making a third processor included in the third system board execute the initialization program stored in the third storing unit, wherein in the initialization process, the third processor stores in the third storing unit, as third resource information, information that associates hardware resources included in the third system board and virtualized hardware resources, and the first processor stores in the management information storing unit, as the management information, a storing location of the third resource information.

3. The information processing apparatus according to claim 1, wherein the virtualization control unit determines a location in the first storing unit, the second storing unit and the third storing unit to respectively store the program text thereon.

4. The information processing apparatus according to claim 1, wherein the management information includes for each virtual machine a pointer that points to a piece of information that associates a hardware resource and the each virtual machine in the first resource information or the second resource information.

5. An apparatus management method performed by an information processing apparatus that includes a first system board including a first processor and a second system board including a second processor, the first processor or the second processor operating as a virtualization control unit, which operates virtual machines by virtualizing hardware resources included in the first system board and the second system board, the apparatus management method comprising:
   first storing, in a first storing unit included in the first system board,
      first resource information, which is information used by the first processor operating as the virtualization control unit by executing a program text, and, in a management information storing unit included in the first system board, management information including information about the system boards included in the information processing apparatus, the information being commonly shared by each of the system boards among information used when the virtualization control unit operates; and second storing, in a second storing unit included in the second system board, second resource information, which is information used by the second processor operating as the virtualization control unit by executing the program text, wherein the virtualization control unit performs an initialization process including:

storing the program text in the first storing unit and the second storing unit, the program text including an initialization program, and making the first processor and the second processor respectively execute in parallel the initialization program stored in the first storing unit and the second storing unit, wherein in the initialization process, the first processor stores in the first storing unit, as the first resource information, information that associates the hardware resources included in the first system board and virtualized hardware resources, the second processor stores in the second storing unit, as the second resource information, information that associates the hardware resources included in the second system board and virtualized hardware resources, and the first processor stores in the management information storing unit, as the management information, storing locations of the first resource information and the second resource information and wherein when the second processor executes a command read from the program text stored in the second storing unit, and when information referred to by the command is not stored in the second resource information in the second storing unit, the second processor refers to the management information stored in the management information storing unit.

6. A non-transitory computer readable storage medium having stored therein an apparatus management program causing an information processing apparatus that includes a first system board including a first processor and a second system board including a second processor, the first processor or the second processor operating as a virtualization control unit, which operates virtual machines by virtualizing hardware resources included in the first system board and the second system board, to execute a process comprising:

first storing, in a first storing unit included in the first system board, first resource information, which is information used by the first processor operating as the virtualization control unit by executing a program text, and, in a management information storing unit included in the first system board, management information including information about the system boards included in the information processing apparatus, the information being commonly shared by each of the system boards among information used when the virtualization control unit operates; and second storing, in a second storing unit included in the second system board, second resource information, which is information used by the second processor operating as the virtualization control unit by executing the program text, wherein the virtualization control unit performs an initialization process including:

storing the program text in the first storing unit and the second storing unit, the program text including an initialization program, and making the first processor and the second processor respectively execute in parallel the initialization program stored in the first storing unit and the second storing unit, wherein in the initialization process, the first processor stores in the first storing unit, as the first resource information, information that associates the hardware resources included in the first system board and virtualized hardware resources, the second processor stores in the second storing unit, as the second resource information, information that associates the hardware resources included in the second system board and virtualized hardware resources, and the first processor stores in the management information storing unit, as the management information, storing locations of the first resource information and the second resource information, and wherein when the second processor executes a command read from the program text stored in the second storing unit, and when information referred to by the command is not stored in the second resource information in the second storing unit, the second processor refers to the management information stored in the management information storing unit.

* * * * *